United States Patent [19]

Ruser

[11] Patent Number: 5,707,079
[45] Date of Patent: Jan. 13, 1998

[54] SHOCK ABSORBING AUXILIARY WHEEL FOR A MOBILE HOME

[76] Inventor: Alfred A. Ruser, 540 W. La Serna, La Habra, Calif. 90631

[21] Appl. No.: 751,577

[22] Filed: Nov. 18, 1996

[51] Int. Cl.⁶ .................................................. B60G 5/00
[52] U.S. Cl. .................................................. 280/767; 280/669
[58] Field of Search ..................................... 280/767, 669, 280/704, 47.2; 267/7, 36.1, 192, 229

[56] References Cited

U.S. PATENT DOCUMENTS

| | | | |
|---|---|---|---|
| 2,752 | 2/1842 | Pierce | 280/767 |
| 1,163,354 | 12/1915 | Meiners | 280/767 X |
| 1,327,864 | 1/1920 | Everingham | 280/767 X |
| 2,168,440 | 8/1939 | Dole | 280/767 |
| 4,007,949 | 2/1977 | Norcia et al. | 280/767 |
| 4,223,912 | 9/1980 | Reyes | 280/767 |

FOREIGN PATENT DOCUMENTS 0116159  6/1918  United Kingdom ............... 280/767

*Primary Examiner*—Christopher P. Ellis

[57] ABSTRACT

A shock absorbing auxiliary wheel for a mobile home with a set of wheels positioned on a lower surface thereof. Further provided is at least one auxiliary wheel assembly positioned behind the wheels of the mobile home. The wheel assembly is adapted to engage the ground and absorb any shock associated with such engagement.

4 Claims, 3 Drawing Sheets

SHOCK ABSORBING AUXILIARY WHEEL FOR A MOBILE HOME

BACKGROUND OF THE INVENTION

1. Field of the Invention

The present invention relates to a shock absorbing auxiliary wheel for a mobile home and more particularly pertains to preventing damage to a mobile home associated with a bottom rear edge thereof engaging a road during travel.

2. Description of the Prior Art

The use of auxiliary wheels is known in the prior art. More specifically, auxiliary wheels heretofore devised and utilized for the purpose of preventing damage to trailers are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,007,949 to Norcia et al.; U.S. Pat. No. 4,988,120 to Jones; U.S. Pat. No. 3,935,606 to Soot; U.S. Pat. No. 3,879,058 to Horn; U.S. Pat. No. 4,863,189 to Lindsay; and U.S. Pat. No. 5,232,233 to Jedora.

In this respect, the shock absorbing auxiliary wheel for a mobile home according to the present invention substantially departs from the conventional concepts and designs of the prior art, and in so doing provides an apparatus primarily developed for the purpose of preventing damage to a mobile home associated with a bottom rear edge thereof engaging a road during travel.

Therefore, it can be appreciated that there exists a continuing need for a new and improved shock absorbing auxiliary wheel for a mobile home which can be used for preventing damage to a mobile home associated with a bottom rear edge thereof engaging a road during travel. In this regard, the present invention substantially fulfills this need.

SUMMARY OF THE INVENTION

In view of the foregoing disadvantages inherent in the known types of auxiliary wheels now present in the prior art, the present invention provides an improved shock absorbing auxiliary wheel for a mobile home. As such, the general purpose of the present invention, which will be described subsequently in greater detail, is to provide a new and improved shock absorbing auxiliary wheel for a mobile home which has all the advantages of the prior art and none of the disadvantages.

To attain this, the present invention essentially comprises a plurality of longitudinal horizontally orientated supports and lateral horizontally orientated supports situated on a bottom surface thereof. Further provided are at least two auxiliary wheel assemblies. Each wheel assembly has a leaf spring having a lower strip with an inboard end and an outboard end each with an aperture formed therein. An upper strip is situated on the lower strip with an inboard end coincident with the inboard end of the lower strip with an aperture formed therein. The upper strip also has an outboard end extending a length 75% that of the lower strip. Each wheel assembly further has a wheel bracket. See FIGS. 2-3. The wheel brackets each have a plate with an aperture formed therein for allowing the coupling thereof with the outboard end of the lower strip of the leaf spring. Each wheel assembly also has a fork extending therefrom on a side opposite the leaf springs with a pair of bores formed therein. Also included as a component of each wheel assembly is a wheel with a cylindrical configuration. Ideally, each wheel is constructed from steel. Each wheel includes an axial bore formed therein for allowing an axle to be rotatably situated therein and coupled at opposite ends thereof between the bores of the fork. For protecting the wheel, a rubber layer lines an outer surface of the entire wheel. As shown in FIGS. 2-3, each wheel assembly has a mounting bracket with an L-shaped configuration. Each mounting bracket has a horizontally orientated extent situated on an upper surface of the inboard end of the upper strip. The horizontally oriented strip has two pairs of spaced apertures formed in opposite sides thereof. Each mounting bracket further has a vertically orientated extent formed integral with the horizontally orientated extent. For allowing coupling with one of the longitudinal supports of the mobile home via a pair of bolts, a pair of apertures are formed adjacent a top edge of the vertically oriented extents. Each mounting bracket further includes a square plate situated on a lower surface of the inboard end of the lower strip with two pairs of spaced apertures formed in opposite sides thereof. Such apertures allow coupling with the apertures of the horizontally oriented extent of the mounting bracket via a pair of bolts.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shock absorbing auxiliary wheel for a mobile home which has all the advantages of the prior art auxiliary wheels and none of the disadvantages.

It is another object of the present invention to provide a new and improved shock absorbing auxiliary wheel for a mobile home which may be easily and efficiently manufactured and marketed.

It is a further object of the present invention to provide a new and improved shock absorbing auxiliary wheel for a mobile home which is of a durable and reliable construction.

An even further object of the present invention is to provide a new and improved shock absorbing auxiliary wheel for a mobile home which is susceptible of a low cost of manufacture with regard to both materials and labor, and which accordingly is then susceptible of low prices of sale to the consuming public, thereby making such shock absorbing auxiliary wheel for a mobile home economically available to the buying public.

Still yet another object of the present invention is to provide a new and improved shock absorbing auxiliary wheel for a mobile home which provides in the apparatuses and methods of the prior art some of the advantages thereof, while simultaneously overcoming some of the disadvantages normally associated therewith.

Still another object of the present invention is to prevent damage to a mobile home associated with a bottom rear edge thereof engaging a road during travel.

Lastly, it is an object of the present invention to provide a new and improved shock absorbing auxiliary wheel for a mobile home with a set of wheels positioned on a lower surface thereof. Further provided is at least one auxiliary wheel assembly positioned behind the wheels of the mobile home. The wheel assembly is adapted to engage the ground and absorb any shock associated with such engagement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
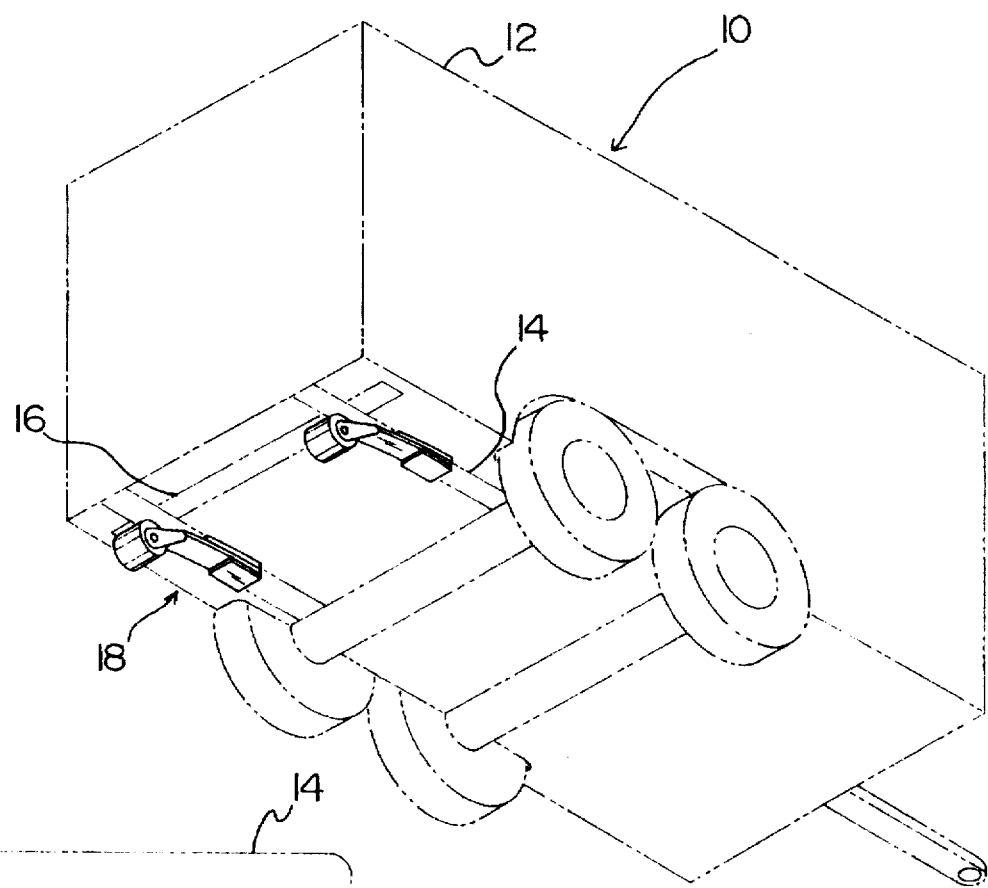
FIG. 1 is a perspective illustration of the preferred embodiment of the shock absorbing auxiliary wheel for a mobile home constructed in accordance with the principles of the present invention.

With reference now to the drawings, and in particular to FIG. 1 thereof, a new and improved shock absorbing auxiliary wheel for a mobile home embodying the principles and concepts of the present invention and generally designated by the reference numeral 10 will be described.

The present invention, the new and improved shock absorbing auxiliary wheel for a mobile home, is comprised of a plurality of components. Such components in their broadest context include a mobile home and a wheel assembly. Such components are individually configured and correlated with respect to each other so as to attain the desired objective.

More specifically, it will be noted that the system 10 of the present invention includes a mobile home 12 having a plurality of longitudinal horizontally orientated supports 14 and lateral horizontally orientated supports 16 situated on a bottom surface thereof.

Further provided are at least two auxiliary wheel assemblies 18. Each wheel assembly has a leaf spring 20 having a lower strip 22 with an inboard end 24 and an outboard end 26 each with an aperture formed therein. The lower strip is 20 inches in length. An upper strip 28 is situated on the lower strip with an inboard end coincident with the inboard end of the lower strip with an aperture formed therein. The upper strip also has an outboard end extending a length 75% that of the lower strip. Each strip is suitably 5/16 of an inch thick and 2½ inches wide.

Each wheel assembly further has a wheel bracket 30. See FIGS. 2–3. The wheel brackets each have a plate 32 with an aperture formed therein for allowing the coupling thereof with the outboard end of the lower strip of the leaf spring. Ideally, the wheel bracket is pivotally coupled to the leaf spring. Each wheel assembly also has a fork 34 extending therefrom on a side opposite the leaf springs with a pair of bores formed therein.

Also included as a component of each wheel assembly is a wheel 36 with a cylindrical configuration. Ideally, each wheel is constructed from steel and has a length of approximately 4 inches. Each wheel includes an axial bore formed therein for allowing an axle 38 to be rotatably situated therein and coupled at opposite ends thereof between the bores of the fork. The axle ideally is in the form of an elongated bolt. For protecting the wheel, a rubber layer 40 lines an outer surface of the entire wheel. While they are not shown in the Figures, brass bushings are preferably positioned between the fork and the head and nut end of the axle.

Figure 2:
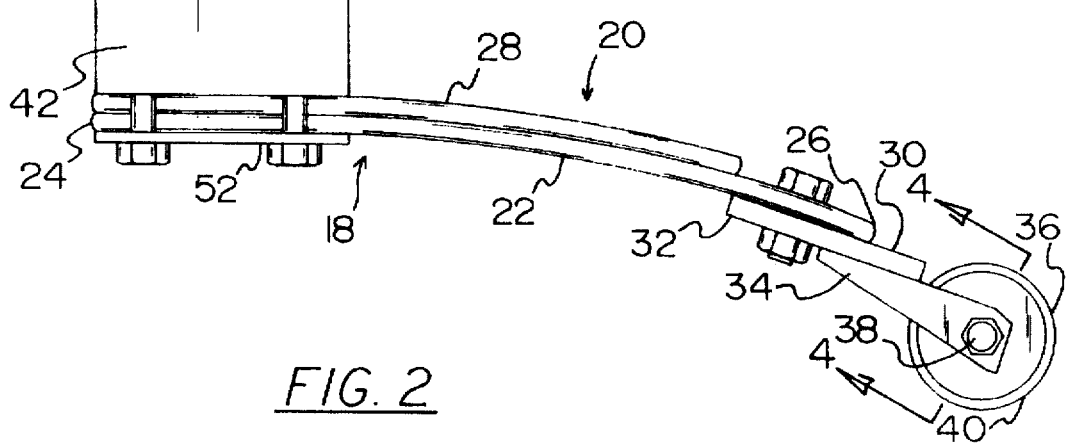
FIG. 2 is a side elevational view of one of the wheel assemblies of the present invention.
Figure 3:
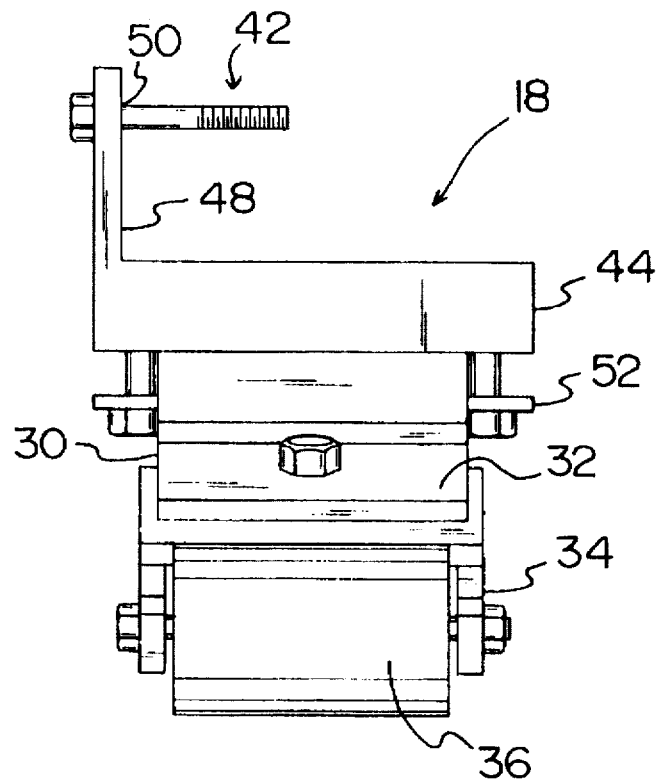
FIG. 3 is a rear elevational view of the wheel assembly shown in FIG. 2.
Figure 4:
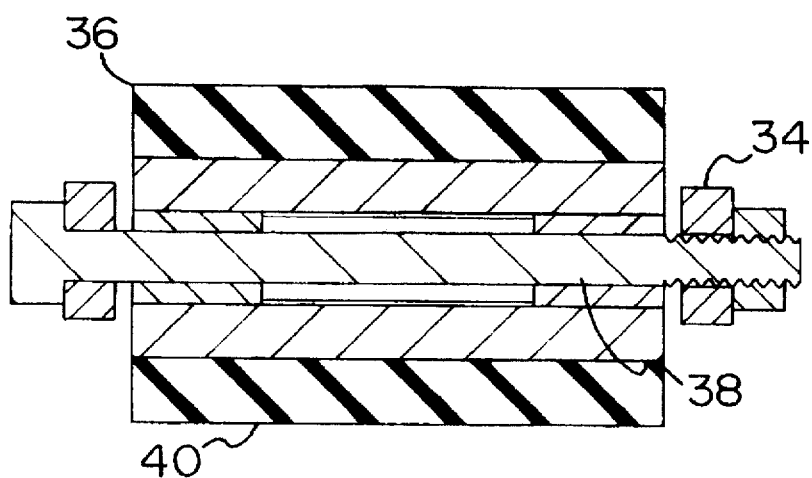
FIG. 4 is a cross-sectional view of the wheel of the wheel assembly.
Figure 5:
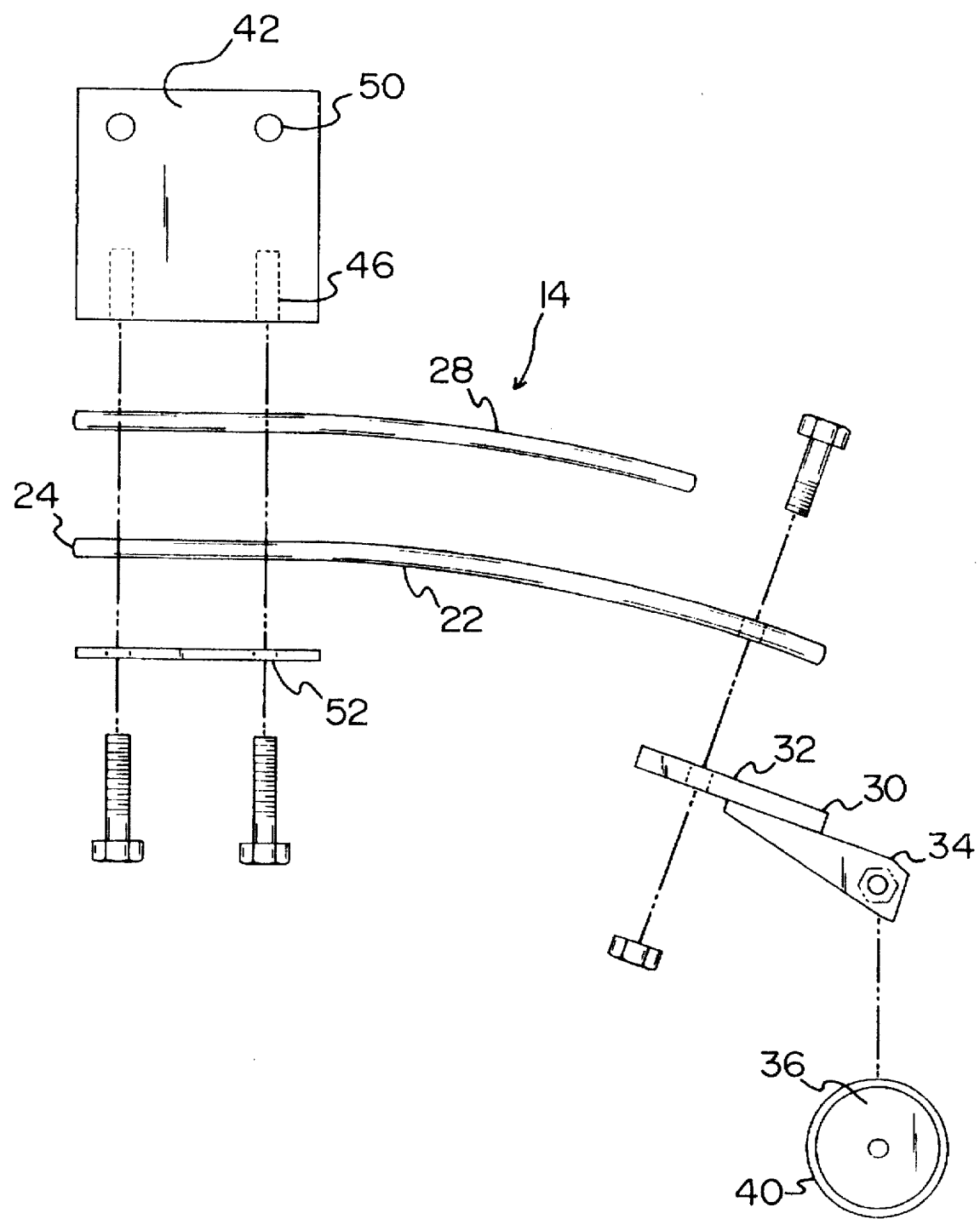
FIG. 5 is an exploded view of the wheel assembly shown in FIG. 2.

As showing in FIGS. 2–3, each wheel assembly has a mounting bracket 42 with an L-shaped configuration. Each mounting bracket has a horizontally orientated extent 44 situated on an upper surface of the inboard end of the upper strip. The horizontally oriented strip has two pairs of spaced apertures 46 formed in opposite sides thereof. Each mounting bracket further has a vertically orientated extent 48 formed integral with the horizontally orientated extent. For allowing coupling with one of the longitudinal supports of the mobile home via a pair of bolts, a pair of apertures 50 are formed adjacent a top edge of the vertically oriented extents. Each mounting bracket further includes a square plate 52 situated on a lower surface of the inboard end of the lower strip with two pairs of spaced apertures formed in opposite sides thereof. Such apertures allow coupling with the apertures of the horizontally oriented extent of the mounting bracket via a pair of bolts, thereby maintaining coupling between the leaf springs and the mobile home.

In use, the wheels of the wheel assemblies are adapted to engage the ground and the leaf springs are adapted to absorb any shock associated with such engagement. Preferably, the outboard end of each lower strip and wheel bracket are situated 4 inches below a lateral support located adjacent a rear end of the mobile home. As such, the lateral support acts as a stopper which limits the amount the wheel may travel vertically.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved shock absorbing auxiliary wheel mechanism for a mobile home comprising, in combination:
   a mobile home having a plurality of longitudinal horizontally orientated supports and lateral horizontally orientated supports situated on a bottom surface thereof; and
   at least two auxiliary wheel assemblies including:
      a leaf spring having a lower strip with an inboard end and an outboard end each with an aperture formed therein and an upper strip with an inboard end coincident with the inboard end of the lower strip with an aperture formed therein and an outboard end extending a length 75% that of the lower strip,
      a wheel bracket comprising a plate with an aperture formed therein for allowing the coupling thereof with the outboard end of the lower strip of the leaf spring, the wheel bracket having a fork extending therefrom on a side opposite the leaf spring with a pair of bores formed therein,
      a wheel with a cylindrical configuration constructed from steel, the wheel including an axial bore formed therein for allowing an axle to be rotatably situated therein and coupled at opposite ends thereof between the bores of the fork and a rubber layer lining an outer surface of the entire wheel, and
      a mounting bracket with an L-shaped configuration having a horizontally orientated extent situated on an upper surface of the inboard end of the upper strip with two pairs of spaced apertures formed in opposite sides thereof and a vertically orientated extent formed integral with the horizontally orientated extent with a pair of apertures formed adjacent a top edge thereof for allowing coupling with one of the longitudinal supports of the mobile home via a pair of bolts, the
      mounting bracket further including a square plate situated on a lower surface of the inboard end of the lower strip with two pairs of spaced apertures formed in opposite sides thereof for allowing coupling with the apertures of the horizontally oriented extent of the mounting bracket via a pair of bolts;
   whereby the wheels of the wheel assemblies are adapted to engage the ground and the leaf springs are adapted to absorb any shock associated with such engagement.

2. A shock absorbing auxiliary wheel mechanism comprising:
   a trailer with a set of wheels positioned on a lower surface thereof; and
   at least one auxiliary wheel assembly positioned behind the wheels of the trailer, whereby the wheel assembly is adapted to engage the ground and absorb any shock associated with such engagement;
   wherein each auxiliary wheel assembly includes a leaf spring having a lower strip with an inboard end and an outboard end each with an aperture formed therein and an upper strip with an inboard end coincident with the inboard end of the lower strip with an aperture formed therein;
   wherein each auxiliary wheel assembly includes a wheel bracket comprising a plate with an aperture formed therein for allowing the coupling thereof with the outboard end of the lower strip of the leaf spring, the wheel bracket having a fork extending therefrom on a side opposite the leaf springs with a pair of bores formed therein.

3. A shock absorbing auxiliary wheel mechanism comprising:
   a trailer with a set of wheels positioned on a lower surface thereof; and
   at least one auxiliary wheel assembly positioned behind the wheels of the trailer, whereby the wheel assembly is adapted to engage the ground and absorb any shock associated with such engagement;
   wherein each auxiliary wheel assembly includes a leaf spring having a lower strip with an inboard end and an outboard end each with an aperture formed therein and an upper strip with an inboard end coincident with the inboard end of the lower strip with an aperture formed therein and an outboard end extending a length 75% that of the lower strip;
   wherein each auxiliary wheel assembly includes a wheel bracket comprising a plate with an aperture formed therein for allowing the coupling thereof with the outboard end of the lower strip of the leaf spring, the wheel bracket having a fork extending therefrom on a side opposite the leaf springs with a pair of bores formed therein;
   wherein each auxiliary wheel assembly includes a wheel with a cylindrical configuration constructed from steel, the wheel including an axial bore formed therein for allowing an axle to be rotatably situated therein and coupled at opposite ends thereof between the bores of the fork and a rubber layer lining an outer surface of the entire wheel.

4. A shock absorbing auxiliary wheel mechanism for a trailer as set forth in claim 3 wherein each auxiliary wheel assembly includes mounting a bracket with an L-shaped configuration having a horizontally orientated extent situated on an upper surface of the inboard end of the upper strip with two pairs of spaced apertures formed in opposite sides thereof and a vertically orientated extent formed integral with the horizontally orientated extent with a pair of apertures formed adjacent a top edge thereof for allowing coupling with longitudinal supports of the trailer via a pair of bolts, the mounting bracket further including a square plate situated on a lower surface of the inboard end of the lower strip with two pairs of spaced apertures formed in opposite sides thereof for allowing coupling with the apertures of the horizontally oriented extent of the mounting bracket via a pair of bolts.

* * * * *